(12) United States Patent
Grant (10) Patent No.: US 10,512,248 B1
(45) Date of Patent: Dec. 24, 2019

(54) DOG WASTE COLLECTION ASSEMBLY

(71) Applicant: Donald Grant, Brooklyn, NY (US)

(72) Inventor: Donald Grant, Brooklyn, NY (US)

(*) Notice: Subject to any disclaimer, the term of this patent is extended or adjusted under 35 U.S.C. 154(b) by 0 days.

(21) Appl. No.: 16/299,821

(22) Filed: Mar. 12, 2019

(51) Int. Cl.
*A01K 23/00* (2006.01)
*E01H 1/12* (2006.01)

(52) U.S. Cl.
CPC .... *A01K 23/005* (2013.01); *E01H 2001/1293* (2013.01)

(58) Field of Classification Search
CPC ............. A01K 23/005; E01H 1/1206; E01H 2001/122; E01H 2001/1226; E01H 2001/1293
USPC .................................................... 294/1.4, 1.5
See application file for complete search history.

(56) References Cited

U.S. PATENT DOCUMENTS

| | | | | |
|---|---|---|---|---|
| 4,010,970 A * | 3/1977 | Campbell | ............ | A01K 23/005 294/1.5 |
| 4,335,678 A | 1/1982 | Garza | | |
| 4,466,647 A | 8/1984 | Spevak | | |
| 4,878,703 A | 11/1989 | Yoshioka | | |
| 5,344,200 A | 9/1994 | Yoshioka | | |
| D355,280 S | 2/1995 | Yoshioka | | |
| 6,062,618 A * | 5/2000 | Figueroa | ............... | E01H 1/1206 294/1.4 |
| 7,198,310 B1* | 4/2007 | Lau | ....................... | A01K 23/005 294/1.5 |
| 7,232,165 B2 | 6/2007 | Zelon | | |
| 7,854,455 B2 | 12/2010 | Ruscil | | |
| 8,146,967 B1* | 4/2012 | Brown | ................. | A01K 23/005 294/1.5 |
| 9,072,280 B1* | 7/2015 | Ramoutar | ............ | A01K 23/005 |
| 9,091,031 B2* | 7/2015 | Naseem | ................. | E01H 1/1206 |
| 2002/0140240 A1 | 10/2002 | Charette | | |
| 2004/0201232 A1 | 10/2004 | Borman | | |
| 2008/0098959 A1* | 5/2008 | Iarrusso | ............... | A01K 23/005 119/161 |
| 2014/0062109 A1 | 3/2014 | Olivera | | |
| 2015/0102617 A1* | 4/2015 | Pluta | ..................... | E01H 1/1206 294/1.4 |

\* cited by examiner

*Primary Examiner* — Dean J Kramer (57) ABSTRACT

A dog waste collection assembly includes a handle that has a downward angle between a grip and a head. Thus, the head can be positioned beneath a dog when the dog is defecating and the grip being gripped. A pair of jaws is each pivotally coupled to the head. Each of the jaws is positionable between a closed and an open position. A pair of bag openers is each coupled to a respective one of the jaws and a bag can be positioned around each of the bag openers. An opening unit is movably coupled to the handle and the opening unit is in mechanical communication with the jaws. The opening unit urges the jaws into the open position when the opening unit is manipulated. Thus, the jaws open the bag for receiving the dog waste.

10 Claims, 6 Drawing Sheets

DOG WASTE COLLECTION ASSEMBLY

CROSS-REFERENCE TO RELATED APPLICATIONS

Statement Regarding Federally Sponsored Research or Development

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to collection devices and more particularly pertains to a new collection device for collecting animal feces in a plastic bag.

BRIEF SUMMARY OF THE INVENTION

An embodiment of the disclosure meets the needs presented above by generally comprising a handle that has a downward angle between a grip and a head. Thus, the head can be positioned beneath a dog when the dog is defecating and the grip being gripped. A pair of jaws is each pivotally coupled to the head. Each of the jaws is positionable between a closed and an open position. A pair of bag openers is each coupled to a respective one of the jaws and a bag can be positioned around each of the bag openers. An opening unit is movably coupled to the handle and the opening unit is in mechanical communication with the jaws. The opening unit urges the jaws into the open position when the opening unit is manipulated. Thus, the jaws open the bag for receiving the dog waste.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
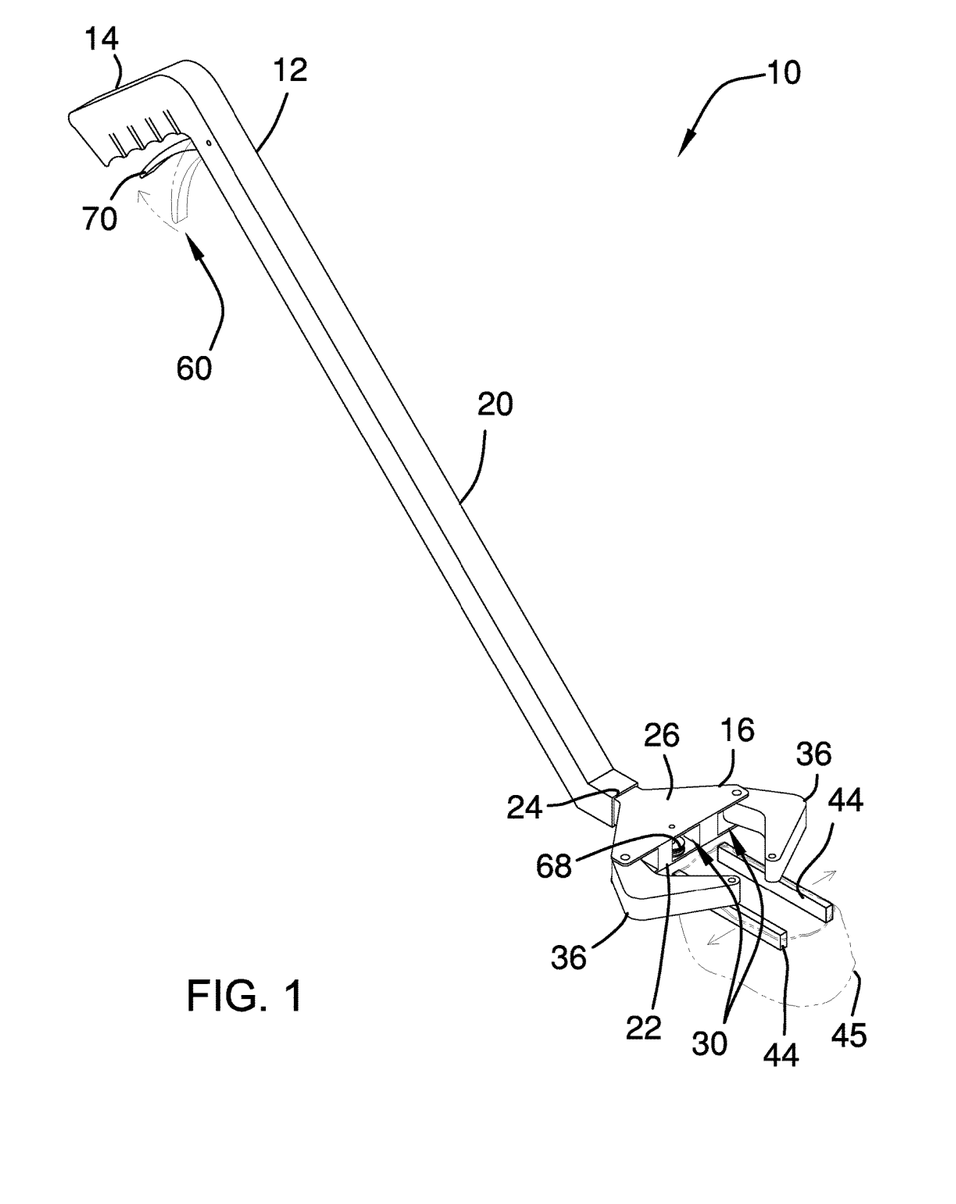
FIG. 1 is a front perspective view of a dog waste collection assembly according to an embodiment of the disclosure.
Figure 2:
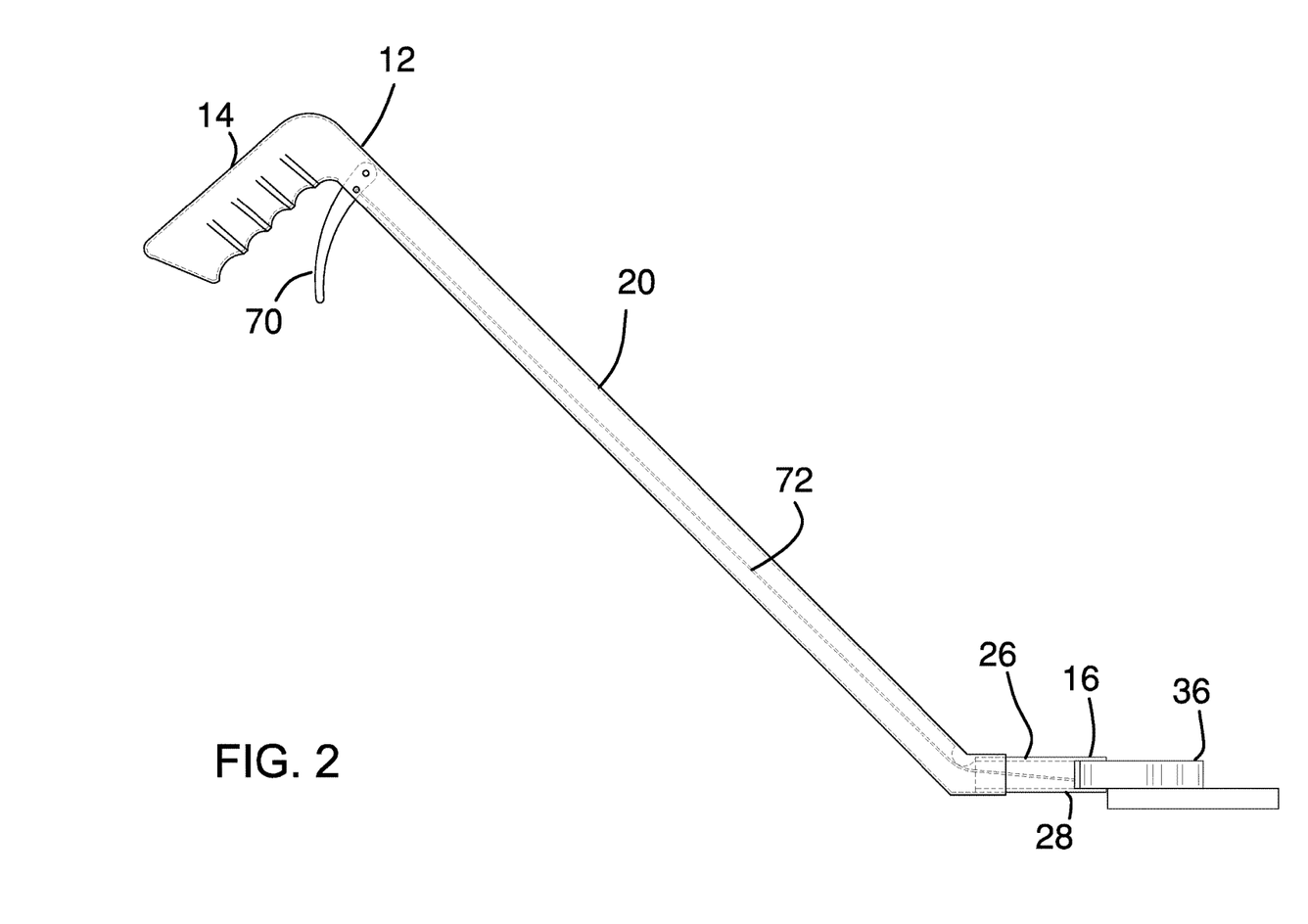
FIG. 2 is a right side phantom view of an embodiment of the disclosure.
Figure 3:
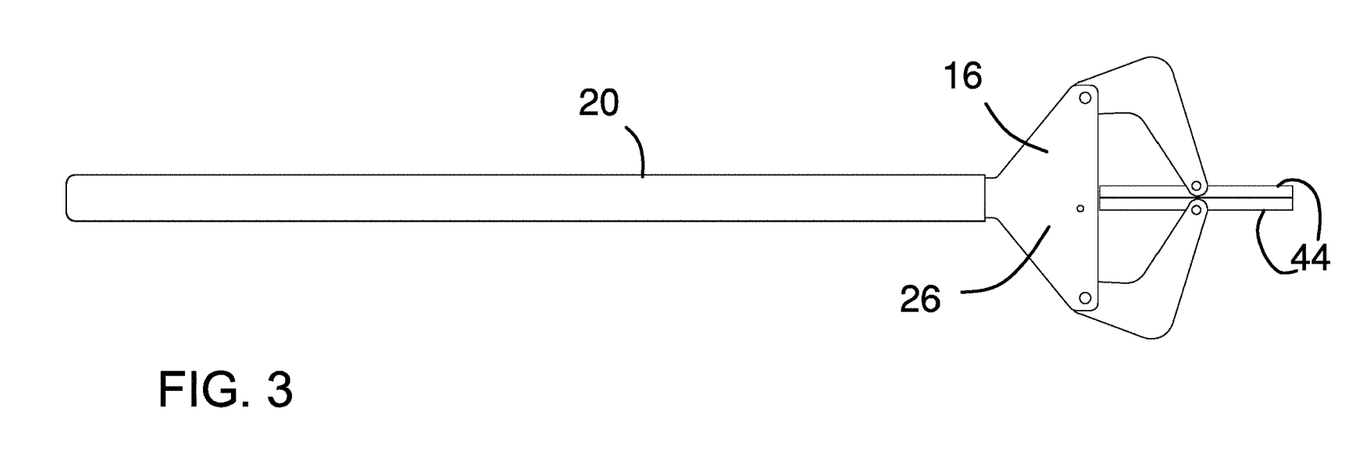
FIG. 3 is a top view of an embodiment of the disclosure showing jaws in a closed position.
Figure 4:
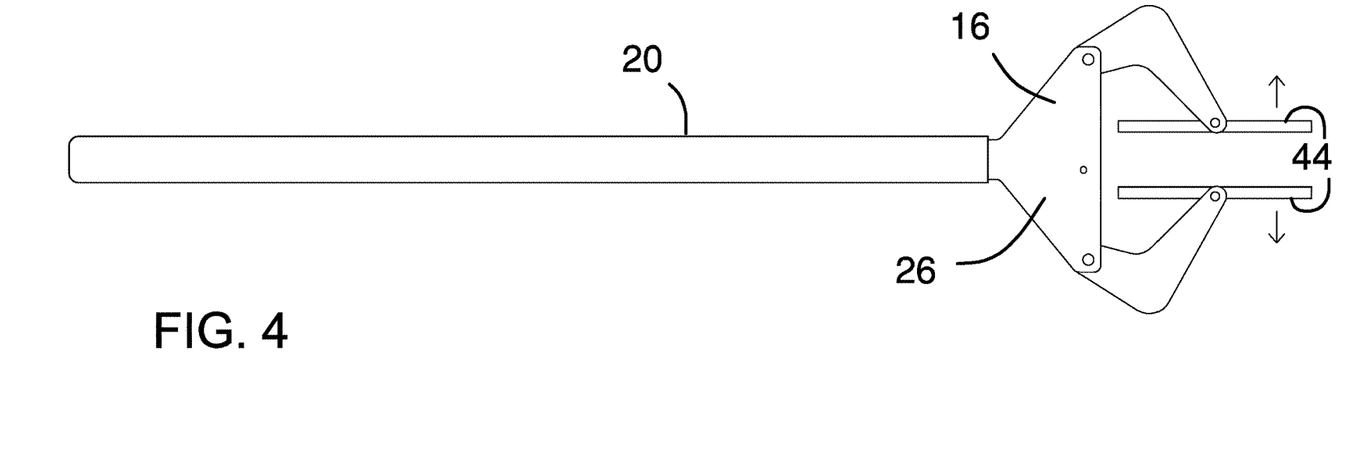
FIG. 4 is a top view of an embodiment of the disclosure showing jaws in an open position.
Figure 5:
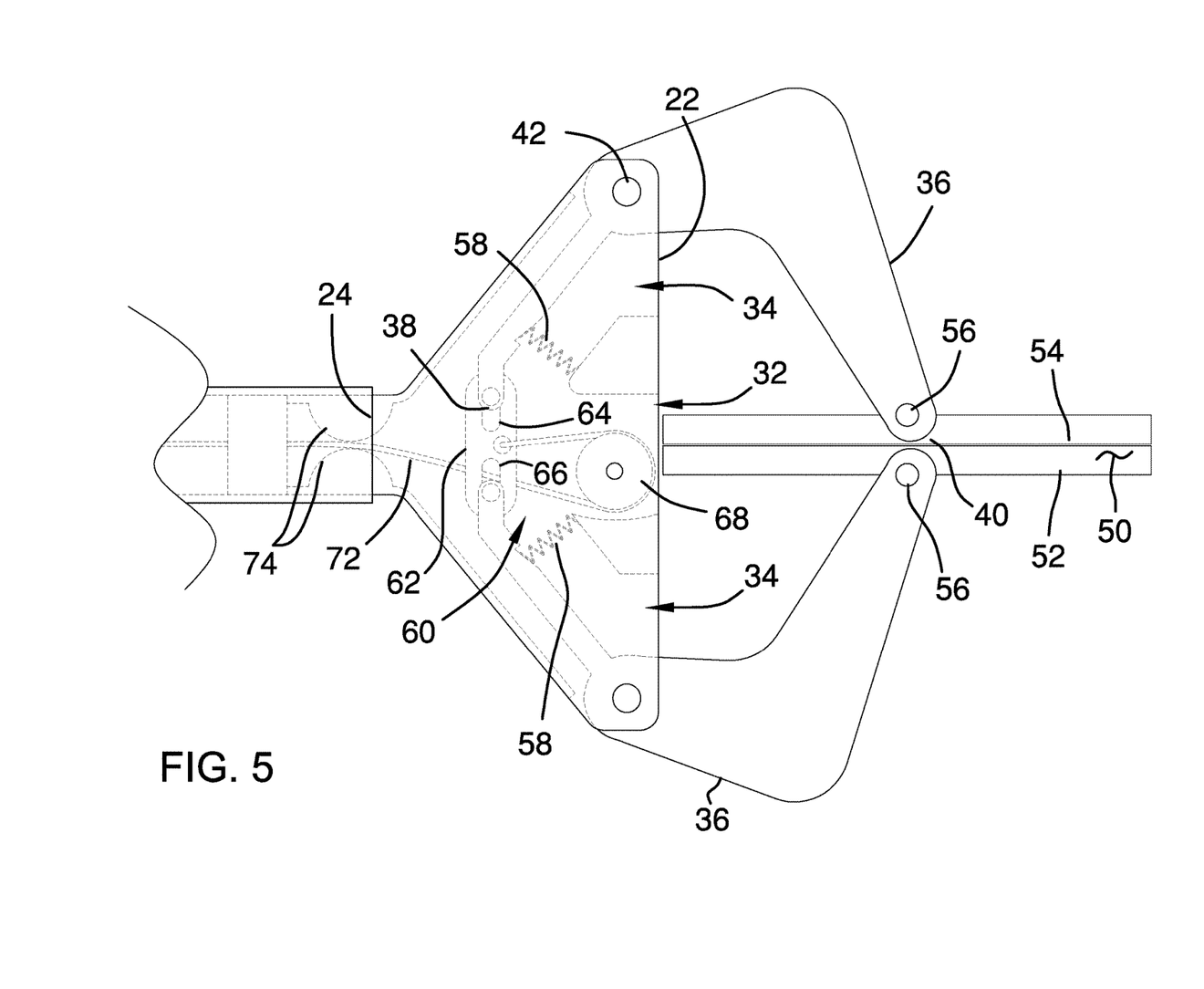
FIG. 5 is a top phantom view of a head of an embodiment of the disclosure showing jaws in a closed position.
Figure 6:
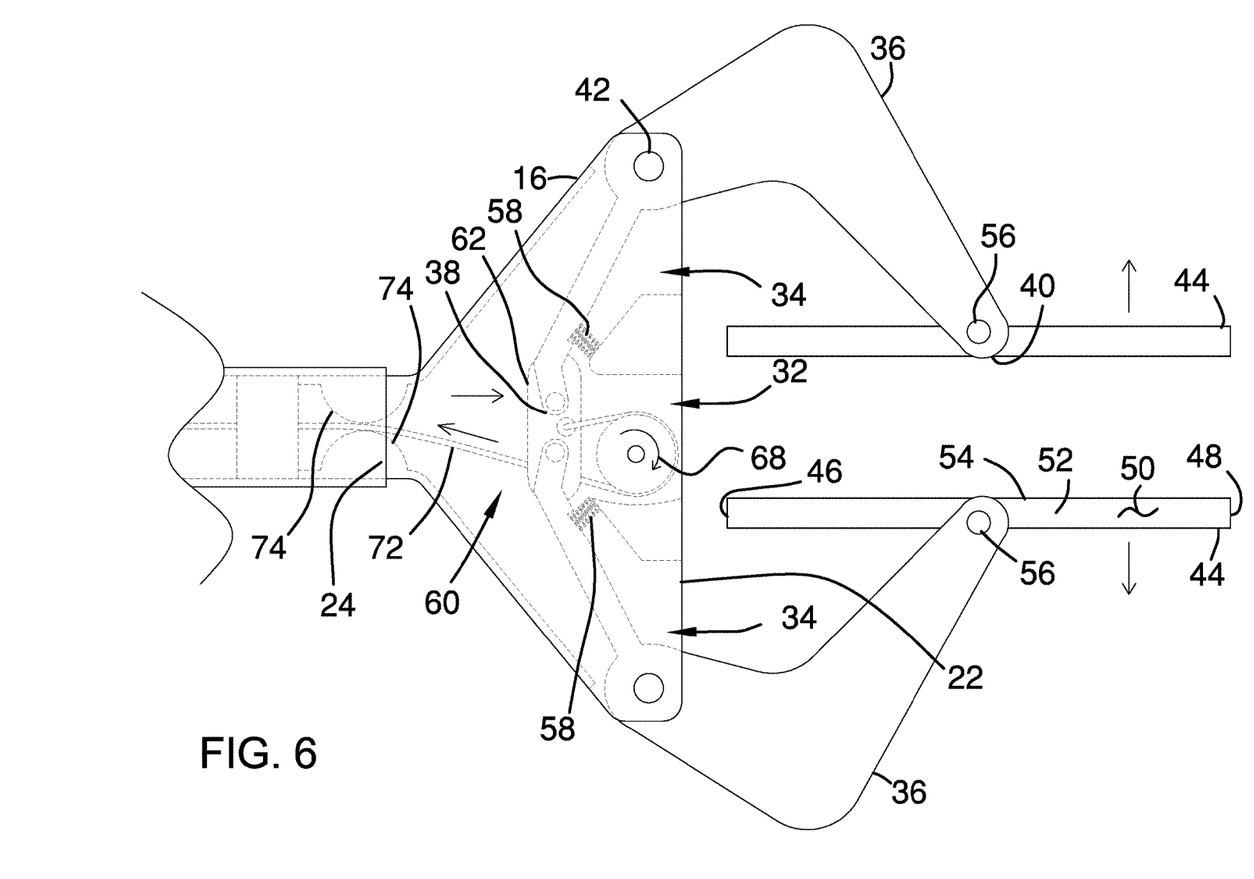
FIG. 6 is a top phantom view of head an embodiment of the disclosure showing jaws in an open position.
Figure 7:
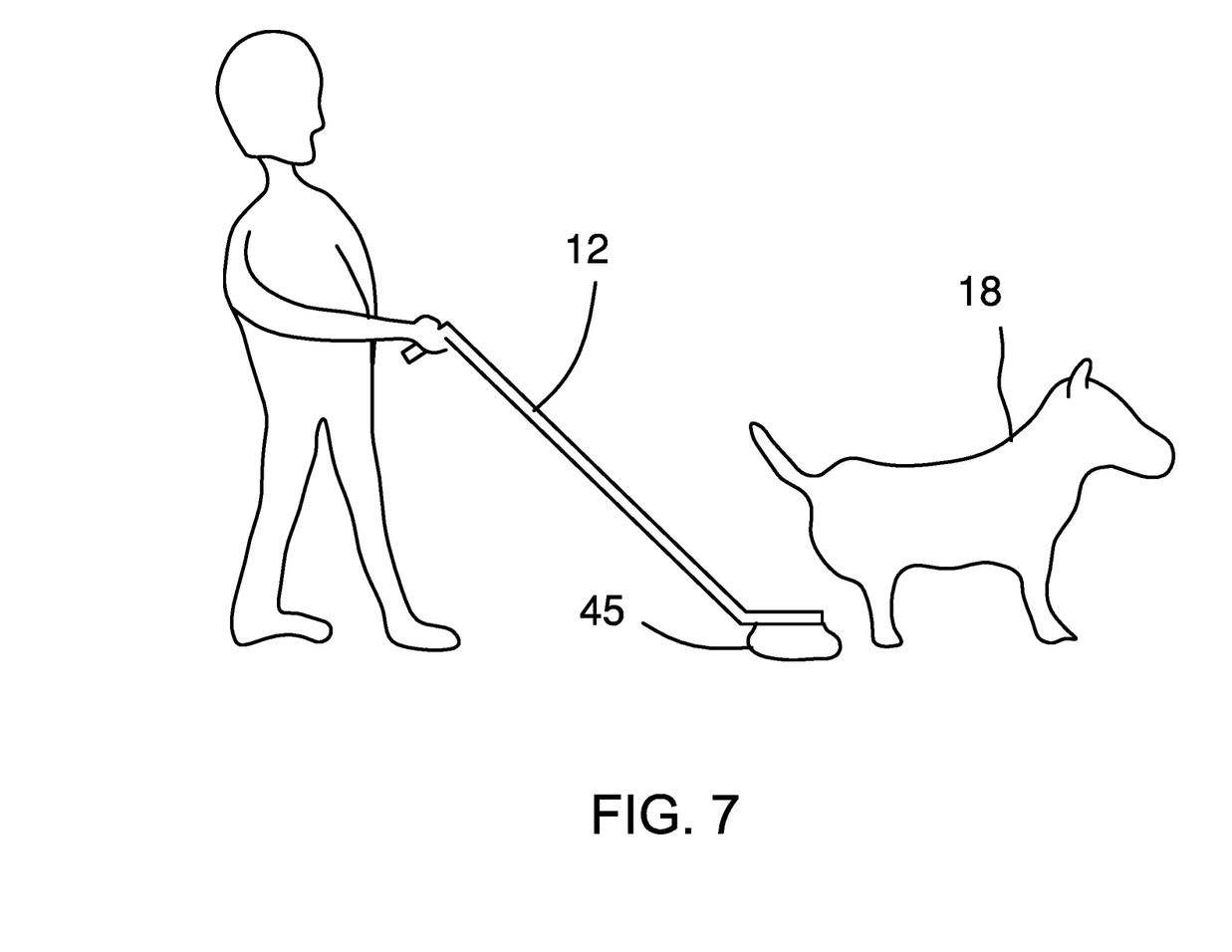
FIG. 7 is a perspective in-use view of an embodiment of the disclosure.

With reference now to the drawings, and in particular to FIGS. 1 through 7 thereof, a new collection device embodying the principles and concepts of an embodiment of the disclosure and generally designated by the reference numeral 10 will be described.

As best illustrated in FIGS. 1 through 7, the dog waste collection assembly 10 generally comprises a handle 12 that has a downward angle between a grip 14 and a head 16. Thus, the head 16 can be positioned beneath a dog 18 when the dog 18 is defecating and the grip 14 is gripped. The handle 12 has a central portion 20 extending between each of the grip 14 and the head 16. The grip 14 forms an angle with and extends rearwardly from the central portion 20. Additionally, the head 16 forms an angle with and extends forwardly from the central portion 20. The angles formed with the head 16 and the grip 14 is congruent with each other. The grip 14 is gripped having the central portion 20 extending downwardly and having the head 16 lying on a horizontal plane when the handle 12 is positioned in a collecting position.

The head 16 has a forward side 22, a back side 24, a top side 26 and a bottom side 28, and the forward side 22 has a plurality of openings 30 each extending into an interior of the head 16. The openings 30 include a central opening 32 and a pair of side openings 34 each positioned on either side of the central opening 32. The back side 24 of the head 16 is attached to the central portion 20 of the handle 12, and each of the head 16, the central portion 20 and the grip 14 is hollow.

A pair of jaws 36 is each pivotally coupled to the head 16 and each of the jaws 36 extends forwardly from the head 16. Each of the jaws 36 is biased together into a closed position and each of the jaws 36 is urgeable into an open position having the jaws 36 being spaced apart from each other. Each of the jaws 36 has a first end 38, a second end 40 and a coupling 42 that is centrally positioned between the first 38 and second 40 ends. Each of the jaws 36 is bent between the first 38 and second 40 ends such that each of the jaws 36 has a U-shape. Additionally, the coupling 42 of each of the jaws 36 pivotally engages each of the top 26 and bottom 28 sides of the head 16 and the first end 38 of each of the jaws 36 is positioned within the head 16. Each of the jaws 36 extends outwardly through a respective one of the side openings 34 in the forward side 22 of the head 16 having the second end 40 of each of the jaws 36 being directed toward each other.

A pair of bag openers 44 is each coupled to a respective one of the jaws 36 and each of the bag openers 44 may have a bag 45 positioned therearound. The bag 45 may be a plastic sandwich bag or other similarly sized bag. Each of the bag openers 44 is spaced apart from each other when the jaws 36 are in the open position to open the bag 45 for receiving the dog 18 waste. In this way the dog 18 waste can be captured in the bag 45 without requiring a user to touch the bag 45.

Each of the bag openers 44 has a primary end 46, a secondary end 48 and an outer surface 50 extending therebetween, and each of the bag openers 44 is elongated between the primary 46 and secondary 48 ends. The outer surface 50 of each of the bag openers 44 has a top side 52 and a first lateral side 54. The top side 52 of the outer surface 50 of each of the bag openers 44 is pivotally coupled to a respective one of the jaws 36 at a pivot point 56. The pivot point 56 is located adjacent to the second end 40 of the respective jaw 36 and the pivot point 56 is centrally positioned on the top side 52.

The first lateral side 54 of the outer surface 50 of each of the bag openers 44 abuts each other when the jaws 36 are in the closed position. Additionally, the first lateral side 54 of the outer surface 50 of each of the bag openers 44 is spaced apart from each other when the jaws 36 are in the open position. A pair of springs 58 is provided, each of the springs 58 is positioned within the head 16 and each of the springs 58 engaging a respective one of the jaws 36. Additionally, each of the springs 58 biases the jaws 36 into the closed position.

An opening unit 60 is movably coupled to the handle 12 and the opening unit 60 is in mechanical communication with the jaws 36. The opening unit 60 urges the jaws 36 into the open position when the opening unit 60 is manipulated. Additionally, the opening unit 60 is positioned on the grip 14 such that the opening unit 60 is accessible to the user. The opening unit 60 comprises a coupler 62 that has a first slot 64 and a second slot 66. The first slot 64 has the first end 38 of a respective one of the jaws 36 is slidably engaged thereto, and the second slot 66 has the first end 38 of a respective one of the jaws 36 is slidably engaged thereto.

Each of the first 64 and second 66 slots is elongated along a longitudinal axis, and each of the first 64 and second 66 slots extends in opposite directions from a center of the coupler 62. Moreover, the longitudinal axis is oriented perpendicular to an axis extending through the forward 22 and back 24 sides of the head 16. The first end 38 of each of the jaws 36 travels along the respective first 64 and second 66 slots when the jaws 36 are moved between the open and closed position.

A pulley 68 is provided and the pulley 68 is rotatably positioned within the head 16. The pulley 68 is aligned with the central opening 32 and the pulley 68 is oriented to rotate about the axis extending through the top 26 and bottom 28 sides of the head 16. Additionally, the pulley 68 is positioned between the central opening 32 and the coupler 62. A lever 70 is pivotally coupled to the handle 12, the lever 70 is positioned on the central portion 20 below the grip 14 and the lever 70 can be squeezed by the user. Moreover, the lever 70 is pivoted upwardly toward the grip 14 when the lever 70 is squeezed.

A cable 72 is coupled between the lever 70 and the coupler 62, and the cable 72 extends around the pulley 68. The cable 72 urges the coupler 62 toward the pulley 68 when the lever 70 is squeezed. Thus, the coupler 62 pulls the first end 38 of the each of the jaws 36 forwardly in the head 16 thereby pivoting each of the jaws 36 on the coupling 42 into the open position. Each of the springs 58 biases the first end 38 of each of the jaws 36 rearwardly in the head 16 when the lever 70 is released. A pair of lobes 74 is each positioned in an interior of the central portion 20 of the handle 12 and the lobes 74 are directed toward each other. The cable 72 runs between the lobes 74, thereby facilitating the lobes 74 to inhibit lateral deflection of the cable 72 as the cable 72 moves back and forth.

In use, a bag 45 is positioned around the bag openers 44 when a dog 18 is being taken for a walk. The grip 14 is gripped and the head 16 is positioned in the collecting position such that the head 16 is positioned beneath the dog 18 when the dog 18 squats to defecate. Additionally, the lever 70 is squeezed to position the jaws 36 in the open position and thusly opening the bag 45. In this way the bag 45 is positioned to collect feces from the dog 18 without requiring the user to touch the bag 45 once the bag 45 is positioned on the bag openers 44. The lever 70 is released when the dog 18 has finished defecating, thusly closing the bag 45. In this way the bag 45 contains the feces for disposal, again without requiring the user to touch the bag 45 once the bag 45 is positioned on the bag openers 44.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

The invention claimed is:

1. A dog waste collection assembly being configured to open a bag for collecting the dog waste when the dog defecates, said assembly comprising:

a handle having a downward angle between a grip and a head wherein said head is configured to be positioned beneath a dog when the dog is defecating and said grip is gripped, said handle having a central portion extending between each of said grip and said head, said grip forming an angle with and extending rearwardly from said central portion, said head forming an angle with and extending forwardly from said central portion, said grip being gripped having said central portion extending downwardly and having said head lying on a horizontal plane when said handle is positioned in a collecting position, said head having a forward side, a top side and a bottom side, said forward side having a plurality of openings each extending into an interior of said head, said openings including a central opening and a pair of side openings each being positioned on either side of said central opening, each of said head, said central portion and said grip being hollow;

a pair of jaws, each of said jaws being pivotally coupled to said head, each of said jaws extending forwardly from said head, each of said jaws being biased together into a closed position, each of said jaws being urgeable into an open position having said jaws being spaced apart from each other;

a pair of bag openers, each of said bag openers being coupled to a respective one of said jaws wherein each of said bag openers is configured to have a bag positioned therearound, each of said bag openers being spaced apart from each other when said jaws are in said open position wherein each of said bag openers is configured to open the bag for receiving the dog waste; and an opening unit being movably coupled to said handle, said opening unit being in mechanical communication with said jaws, said opening unit urging said jaws into said open position when said opening unit is manipulated, said opening unit being positioned on said grip wherein said opening unit is configured to be accessible to the user.

2. The assembly according to claim 1, wherein each of said jaws has a first end, a second end and a coupling being centrally positioned between said first and second ends, each of said jaws being bent between said first and second ends such that each of said jaws has a U-shape, said coupling of each of said jaws pivotally engaging each of said top and bottom sides of said head having said first end of each of said jaws being positioned within said head, each of said jaws extending outwardly through a respective one of said side openings in said forward side of said head having said second end of each of said jaws being directed toward each other.

3. The assembly according to claim 2, wherein each of said bag openers has a primary end, a secondary end and an outer surface extending therebetween, each of said bag openers being elongated between said primary and secondary ends, said outer surface of each of said bag openers having a top side and a first lateral side, said top side of said outer surface of each of said bag openers being pivotally coupled to a respective one of said jaws at a pivot point being located adjacent to said second end of said respective jaw, said pivot point being centrally positioned on said top side.

4. The assembly according to claim 3, wherein said first lateral side of said outer surface of each of said bag openers abuts each other when said jaws are in said closed position, said first lateral side of said outer surface of each of said bag openers being spaced apart from each other when said jaws are in said open position.

5. The assembly according to claim 2, wherein said opening unit comprises a coupler having a first slot and a second slot, said first slot having said first end of a respective one of said jaws being slidably engaged thereto, said second slot having said first end of a respective one of said jaws being slidably engaged thereto.

6. The assembly according to claim 5, wherein said opening unit comprises a pulley being rotatably positioned within said head, said pulley being aligned with said central opening, said pulley being oriented to rotate about an axis extending through said top and bottom sides of said head, said pulley being positioned between said central opening and said coupler.

7. The assembly according to claim 6, wherein said opening unit comprises a lever being pivotally coupled to said handle, said lever being positioned on said central portion below said grip wherein said lever is configured to be squeezed by the user, said lever being pivoted upwardly toward said grip when said lever is squeezed.

8. The assembly according to claim 7, wherein said opening unit comprises a cable being coupled between said lever and said coupler, said cable extending around said pulley, said cable urging said coupler toward said pulley when said lever is squeezed, said coupler pulling said first end of said each of said jaws forwardly in said head thereby pivoting each of said jaws on said coupler into said open position, each of said springs biasing said first end of each of said jaws rearwardly in said head when said lever is released.

9. The assembly according to claim 1, further comprising a pair of springs, each of said springs being positioned within said head, each of said springs engaging a respective one of said jaws, said each of said springs biasing said jaws into said closed position.

10. A dog waste collection assembly being configured to open a bag for collecting the dog waste when the dog defecates, said assembly comprising:

a handle having a downward angle between a grip and a head wherein said head is configured to be positioned beneath a dog when the dog is defecating and said grip is gripped; said handle having a central portion extending between each of said grip and said head, said grip forming an angle with and extending rearwardly from said central portion, said head forming an angle with and extending forwardly from said central portion, said grip being gripped having said central portion extending downwardly and having said head lying on a horizontal plane when said handle is positioned in a collecting position, said head having a forward side, a top side and a bottom side, said forward side having a plurality of openings each extending into an interior of said head, said openings including a central opening and a pair of side openings each being positioned on either side of said central opening, each of said head, said central portion and said grip being hollow, a pair of jaws, each of said jaws being pivotally coupled to said head, each of said jaws extending forwardly from said head, each of said jaws being biased together into a closed position, each of said jaws being urgeable into an open position having said jaws being spaced apart from each other, each of said jaws having a first end, a second end and a coupling being centrally positioned between said first and second ends, each of said jaws being bent between said first and second ends such that each of said jaws has a U-shape, said coupling of each of said jaws pivotally engaging each of said top and bottom walls sides of said head having said first end of each of said jaws being positioned within said head, each of said jaws extending outwardly through a respective one of said side openings in said forward side of said head having said second end of each of said jaws being directed toward each other;

a pair of bag openers, each of said bag openers being coupled to a respective one of said jaws wherein each of said bag openers is configured to have a bag positioned therearound, each of said bag openers being spaced apart from each other when said jaws are in said open position wherein each of said bag openers is configured to open the bag for receiving the dog waste, each of said bag openers having a primary end, a secondary end and an outer surface extending therebetween, each of said bag openers being elongated between said primary and secondary ends, said outer surface of each of said bag openers having a top side and a first lateral side, said top side of said outer surface of each of said bag openers being pivotally coupled to a respective one of said jaws at a pivot point being located adjacent to said second end of said respective jaw, said pivot point being centrally positioned on said top side, said first lateral side of said outer surface of each of said bag openers abutting each other when said jaws are in said closed position, said first lateral side of said outer surface of each of said bag openers being spaced apart from each other when said jaws are in said open position;

a pair of springs, each of said springs being positioned within said head, each of said springs engaging a respective one of said jaws, said each of said springs biasing said jaws into said closed position;

an opening unit being movably coupled to said handle, said opening unit being in mechanical communication with said jaws, said opening unit urging said jaws into said open position when said opening unit is manipulated, said opening unit being positioned on said grip wherein said opening unit is configured to be accessible to the user, said opening unit comprising:

a coupler having a first slot and a second slot, said first slot having said first end of a respective one of said jaws being slidably engaged thereto, said second slot having said first end of a respective one of said jaws being slidably engaged thereto;

a pulley being rotatably positioned within said head, said pulley being aligned with said central opening, said pulley being oriented to rotate about an axis extending through said top and bottom sides of said head, said pulley being positioned between said central opening and said coupler;

a lever being pivotally coupled to said handle, said lever being positioned on said central portion below said grip wherein said lever is configured to be squeezed by the user, said lever being pivoted upwardly toward said grip when said lever is squeezed; and a cable being coupled between said lever and said coupler, said cable extending around said pulley, said cable urging said coupler toward said pulley when said lever is squeezed, said coupler pulling said first end of said each of said jaws forwardly in said head thereby pivoting each of said jaws on said coupler into said open position, each of said springs biasing said first end of each of said jaws rearwardly in said head when said lever is released.

* * * * *